(12) United States Patent
Carlson

(10) Patent No.: US 8,966,797 B2
(45) Date of Patent: Mar. 3, 2015

(54) FIREARM SAFETY SYSTEM

(71) Applicant: Trevor Edwin Carlson, Garrettsville, OH (US)

(72) Inventor: Trevor Edwin Carlson, Garrettsville, OH (US)

(73) Assignee: Black Bart, Inc., Brunswick, OH (US)

( * ) Notice: Subject to any disclaimer, the term of this patent is extended or adjusted under 35 U.S.C. 154(b) by 0 days.

(21) Appl. No.: 13/827,819

(22) Filed: Mar. 14, 2013

(65) Prior Publication Data

US 2014/0259841 A1   Sep. 18, 2014

(51) Int. Cl.
  *F41A 17/06*   (2006.01)
  *F41A 17/56*   (2006.01)
  *F41A 17/64*   (2006.01)

(52) U.S. Cl.
  CPC .............. *F41A 17/063* (2013.01); *F41A 17/56* (2013.01)
  USPC .......... 42/1.01; 42/70.05; 42/70.08; 42/70.11

(58) Field of Classification Search
  CPC ....... F41A 17/02; F41A 17/06; F41A 17/063; F41A 17/066; F41A 17/08
  USPC ........ 42/1.01, 66, 70.01, 70.04, 70.05, 70.11, 42/70.08; 89/27.12
  See application file for complete search history.

(56) References Cited

U.S. PATENT DOCUMENTS

| | | | |
|---|---|---|---|
| 4,563,827 A * | 1/1986 | Heltzel | 42/70.01 |
| 5,423,143 A * | 6/1995 | Martin | 42/70.01 |
| 5,448,847 A | 9/1995 | Teetzel | |
| 5,953,844 A * | 9/1999 | Harling et al. | 42/70.06 |
| 6,223,461 B1 | 5/2001 | Mardirossian | |
| 6,293,039 B1 | 9/2001 | Fuchs | |
| 6,301,815 B1 * | 10/2001 | Sliwa | 42/70.01 |
| 6,345,461 B1 * | 2/2002 | Constant et al. | 42/84 |
| 6,415,542 B1 | 7/2002 | Bates et al. | |
| 6,735,897 B1 * | 5/2004 | Schmitter et al. | 42/70.01 |
| 6,823,621 B2 | 11/2004 | Gotfried | |
| 2002/0178635 A1 * | 12/2002 | Martin | 42/70.11 |
| 2013/0019512 A1 * | 1/2013 | Kemmerer et al. | 42/70.05 |
| 2013/0318847 A1 * | 12/2013 | Kelly | 42/70.06 |

OTHER PUBLICATIONS

International Search Report and Written Opinion for International Application No. PCT/US2013/031677 dated Dec. 11, 2013.

\* cited by examiner

*Primary Examiner* — Bret Hayes
(74) *Attorney, Agent, or Firm* — Tucker Ellis LLP

(57) ABSTRACT

A firearm safety system and method is described herein. The system may include a tracking system, a smart firearm and/or a smart magazine, and a smart tracking unit. The tracking system is in communication with satellites that monitor specific locations, a smart firearm and a portable electronic device. The tracking system includes an internal geographical database of specific monitored locations. The smart firearm includes a microprocessor and a receiver. The motor operates in response to a signal received, which may indicate that the firearm is approaching a no gun safety zone, whereby the signal causes the microprocessor to operate the automatic safety lock to prevent the apparatus from operating. The receiver monitors signals and receives location data from the satellites. The method of operating a smart firearm includes receiving a signal at the at least one receiver and responding to the signal by locking the automatic safety lock.

18 Claims, 7 Drawing Sheets

FIREARM SAFETY SYSTEM

FIELD OF INVENTION

The present invention generally relates to a firearm safety system and, more particularly, to a system for the prevention of any unauthorized and/or undesired discharge of a firearm.

BACKGROUND

Gun safety is a widespread and overriding issue in today's society and one of the biggest concerns is gun control. These concerns include accidental shootings, the use of guns by children, suicide, possession of firearms by criminals, and the shooting of police officers and law enforcement agents with the officer or agent's own weapon while in the line of duty.

Another area of concern is the complete prevention of accidental discharge of weapons so as to avoid unintentional injuries or death. For example, weapons may come into the hands of children or inexperienced firearm users, which may then be accidentally or improperly discharged, resulting in death or serious injury. Police officers, security guards, correctional facility officers and other law enforcement officers typically carry a firearm for their own protection as well as the protection of others. Such law enforcement officers may be continually exposed to situations where potential assailants must be physically confronted or detained. During the process of being confronted or detained, potential assailants may have the chance to take the officer's firearm away from him. The officer then faces the risk that the assailant will use his own firearm against him.

Typically, people on both sides of the gun control issue support the development of devices which prevent unauthorized gun use. Such restrictions may commonly be endorsed as means for preventing gun use by children and criminals. Accordingly, efforts have been made to incorporate firearms with devices, which may restrict or control use.

Devices have been developed to address this need for firearm safety devices. There have been numerous attempts to improve gun safety by use of mechanical safety locks. Some of the initial attempts at safety were by the design of trigger locks. The trigger lock is traditionally operated by a key and prevents the firearm from being used unless the lock is removed. However, if someone has access to the key, the trigger lock can be removed and the firearm discharged. Accordingly, it does not eliminate firearm use by a child or intruder. Furthermore, if the lock is not used, the firearm may be discharged by anyone who has access to the firearm.

Historically, manufacturers of firearms have attempted to develop safety systems that may aid in the prevention of the unintentional discharge of firearms, such as a grip safety. It may require that the shooter to depress the grip safety sufficiently before the firearm can be fired. Thus, an unintentional trigger pull that could occur from dropping or other mishandling of the firearm would not allow the firearm to fire because the grip safety would have to be depressed also. If the grip safety is not properly gripped, it may not be depressed sufficiently to allow the firearm to be fired.

A thumb safety operates by manually shifting the safety lever from its "safe" position to its "fire" position. A grip safety is automatically shifted to its "fire" position when the user's hand engages the stock or handle of the weapon.

Other types of devices may utilize personalized data. For example, some gun safety devices may use finger or hand print data in identifying authorized users and enabling operation. Similarly, others may use voice recognition circuitry for identifying authorized users and enabling operation. Pressure sensing grip sensors may be used to determine if the gripping pattern matches the pattern of an authorized user of the firearm. That is, it suggests using the pattern of how the authorized user grips the firearm as a means of recognizing him. These concepts may use pressure sensors as grip sensors.

Another safety mechanism for a firearm may consist of a specialized scanning mechanism built into the firearm's trigger. The scanner may be programmed to read the unique fingerprints of a given individual. The device may be capable of holding the programmed print information for more than one person, so that multiple people would be able to use the firearm. However, usage may be limited to only those persons whose hand prints have been pre-stored in the scanner. The scanner mechanism may be connected to the firearm's safety lock, whereby the safety may be prevented from being released without proper authorization from the scanner. When a person grips the weapon and places his finger on the trigger, the pressure of the finger on the trigger may activate the scanner, and the scanner reads the fingerprint to determine if the scanned fingerprint matches one of the pre-stored fingerprint images. If the individual is an authorized user, the scanner may transmit a signal to the safety, releasing this device and activating the firearm for use.

Prior firearm safety systems have certain drawbacks or disadvantages. Therefore, there is a need for an improved firearm safety system, such as a system that may be computer assisted for safety, accountability, and public safety. The desired solution may prevent gun violence that can be established without eroding citizens' rights to own and/or carry firearms.

SUMMARY

A firearm safety system is described herein. The firearm safety system may include a tracking system, a smart firearm and/or a smart magazine, and a smart tracking unit. The smart firearm apparatus may include a frame housing at least one microprocessor and at least one receiver in communication with the at least one microprocessor, wherein the at least one receiver may be configured to receive a signal. The smart firearm apparatus may also include at least one motor in communication with the at least one microprocessor, a trigger capable of operating the apparatus, a sear mechanically connected to the trigger, a striker mechanically connected to the sear, and at least one automatic safety lock in communication with the at least one microprocessor and the at least one motor. The at least one motor may be configured to operate in response to the signal received by the at least one receiver and the at least one motor may be configured to operate the at least one automatic safety lock to prevent the apparatus from operating. The at least one automatic safety lock may be configured to prevent the sear from engaging the striker whereby the apparatus may be unable to operate.

The at least one receiver may be configured to monitor signals and receive location data from at least one satellite. The smart firearm apparatus may also include at least one transmitter that may be configured to communicate with the at least one microprocessor and the at least one receiver, wherein the at least one transmitter may be configured to transmit a signal. The apparatus may also include a tracking unit in communication with the at least one microprocessor. The tracking unit may include an internal geographical database of specific monitored locations. The specific monitored locations may include schools and federal buildings, for example.

The at least one safety lock may be configured to permit the apparatus to operate and prevent the apparatus from operating. The at least one safety lock may comprise a bar. The specific monitored locations may include a designated no gun safety zone around the locations. The at least one receiver may be capable of receiving geographic coordinate signals and the at least one microprocessor may be capable of matching those geographic coordinate signals with an internal pre-stored geographical database of specific monitored locations. The signal may be received at the at least one receiver indicating that the smart firearm apparatus may be approaching a no gun safety zone, whereby the signal may cause the at least one microprocessor to operate the at least one automatic safety lock.

A method of operating a smart firearm is disclosed herein. The smart firearm may include a trigger capable of operating the apparatus, a sear mechanically connected to the trigger, a striker mechanically connected to the sear, at least one microprocessor, at least one receiver, and at least one automatic safety lock. The method of operating a smart firearm may comprise the steps of: receiving a signal at the at least one receiver and responding to the signal by locking the at least one automatic safety lock. The at least one automatic safety lock may be configured to prevent the sear from engaging the striker whereby the apparatus may be unable to operate when the trigger is pulled. The signal may be received from a tracking system. The tracking system may be in communication with at least one satellite. The at least one receiver may be capable of receiving geographic coordinate signals and the at least one microprocessor may be capable of matching those geographic coordinate signals with an internal pre-stored geographical database of specific monitored locations. The signal may be received at the at least one receiver indicating that the firearm may be approaching a no gun safety zone, whereby the signal may cause the at least one microprocessor to operate the at least one automatic safety lock to lock the firearm.

A firearm safety system is disclosed herein. The firearm safety system may include a tracking system that may be communication with at least one satellite, wherein the at least one satellite may be capable of monitoring specific locations. The firearm safety system may also include a smart firearm including a microprocessor and tracking unit, wherein the smart firearm may be configured to communicate with the tracking system. The firearm safety system may also include a portable electronic device that may be configured to communicate with the tracking system and the smart firearm, wherein the portable electronic device may be configured to lock and unlock the smart firearm. When the smart firearm approaches a specific location being monitored, the portable electronic device may be capable of producing a warning signal, and when the smart firearm enters into the specific location being monitored, the smart firearm may be configured to be locked down upon entering the specific location being monitored.

BRIEF DESCRIPTION OF THE DRAWINGS

Objects and advantages together with the operation of the invention may be better understood by reference to the following detailed description taken in connection with the following illustrations, wherein.

DETAILED DESCRIPTION

Figure 1:
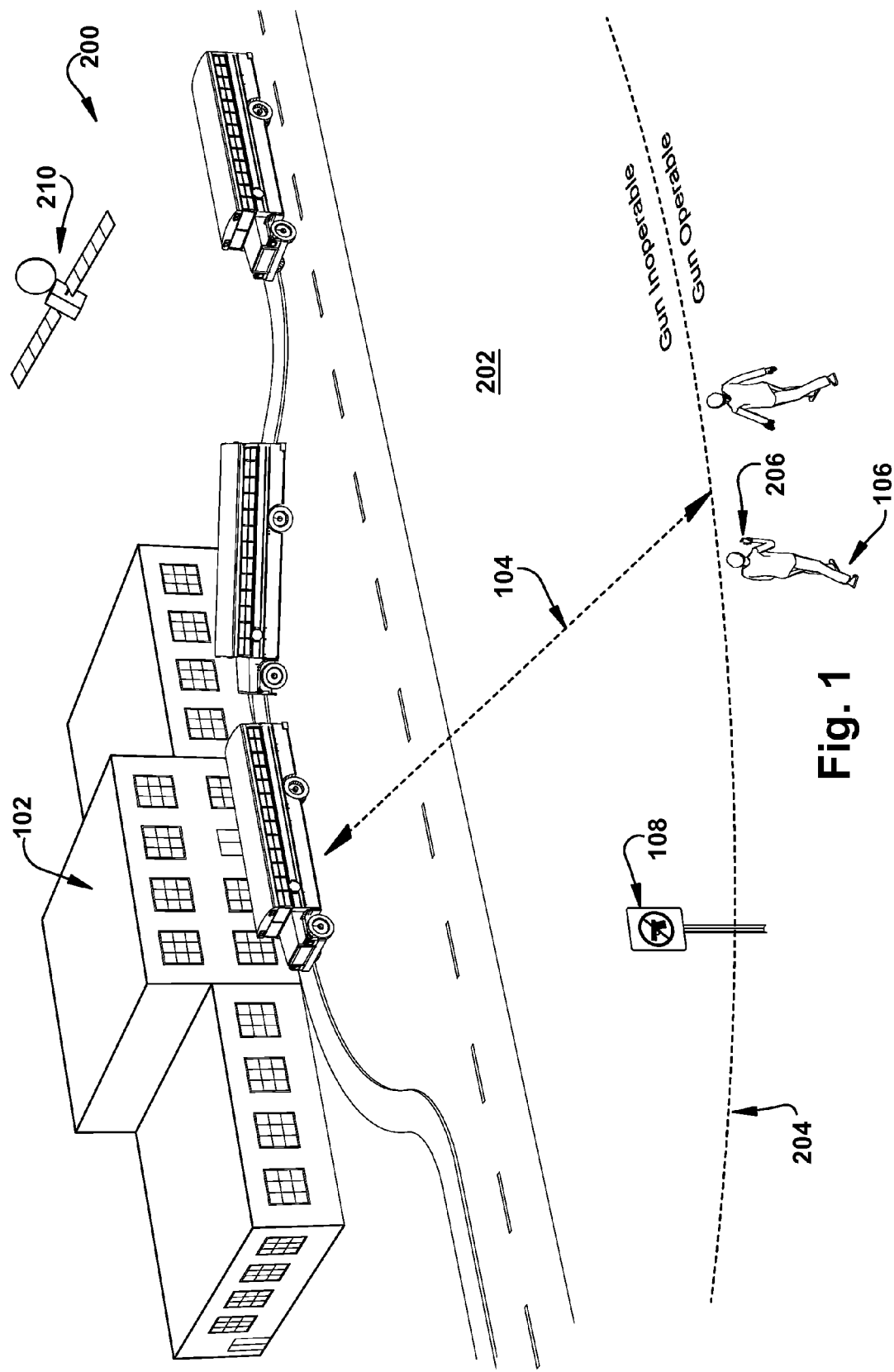
FIG. 1 illustrates a perspective view of an exemplary embodiment of a firearm safety system in use with a safety zone.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention. Additionally, as used herein, the term "exemplary" is intended to mean serving as an illustration or example of something, and is not intended to indicate a preference.

A firearm safety system 100 (the "system 100") is illustrated in FIGS. 1-7. The firearm safety system 100 may also be referred to as the SmartGun Safety System. The firearm safety system 100 may include any appropriate number or types of components. In an exemplary embodiment, the firearm safety system 100 may include a tracking component 200 and a smart gun or smart firearm component 300. In another exemplary embodiment, the firearm safety system 100 may include a tracking component 200 and a smart magazine component 400. The tracking component 200 may be referred to as the SmartTracker, the smart firearm component 300 may be referred to as the SmartGun and the smart magazine component 400 may be referred to as the SmartMag.

The tracking component 200 or system may include at least one safety zone 202, at least one safety perimeter 204, at least one smart tracking unit and at least one smart tracking application. The tracking system 200 may also include at least one satellite tracking system 210.

The firearm safety system 100 may be utilized for any appropriate purpose. For example, the firearm safety system 100 may be utilized to prevent public and personal safety threats. In an exemplary embodiment, the firearm safety system 100 may be utilized to protect buildings 102, such as schools, federal buildings, private corporations and the like. The firearm safety system 100 may be utilized with safety zones 202 and safety perimeters 204. Each safety zone 202 and/or safety perimeter 204 may have a posted sign 108 indicating that the firearm owner 106 is about to cross the safety perimeter 204 and enter the safety zone 202, as illustrated in FIG. 1. The safety zones 202 may be referred to as No Gun SafetyZones and the safety perimeters 204 may be referred to as No Gun SafetyPerimeters.

The firearm safety system 100 may assure that each smart firearm owner adheres to all established firearm safety laws. The firearm safety system 100 may be used for schools, governments, corporations, residences, churches, military bases, conflict zones, political and public events, and numerous other applications and should not be limited to that disclosed herein. As shown in FIG. 1, a safety perimeter 204 may be established via satellite 210 or any other appropriate means around any school, government building, or corporate service subscribers. No smart firearm 300 or smart magazine 400 would be operable inside that safety perimeter 204. Many public institutions such as schools and courthouses, may establish at least one safety zone 202 around the desired building(s). Each building 102 to be protected may include one or more safety zones 202 in any desired location.

Each safety zone 202 may include a safety perimeter 204. Each safety perimeter 204 may be set at any desired distance 104 around the protected building(s) 102, as illustrated in FIG. 1. For example, a safety perimeter 204 located around a school and its associated buildings may be set at approximately 3,000 feet. The safety zones 202 and associated safety perimeters 204 may be adjustable and are not necessarily set to one specific distance. For example, the safety perimeter 204 around a school may be set to 3,000 feet from the exterior of the school building(s) during the school year, school week and during school events, but the safety perimeter 204 may then be adjusted to 1,500 feet from the exterior of the school buildings during the summers or during afterhours.

In addition, the safety zones 202 may not be limited to federal and state protected buildings and/or events. For example, a customer or subscriber of the firearm safety system may desire to create a safety zone 202 absent of any legal, operable smart firearms 300 or smart magazines 400. For example, local law enforcement officers and the like may still have operable firearms and magazines within the safety zone 202.

Figure 2:
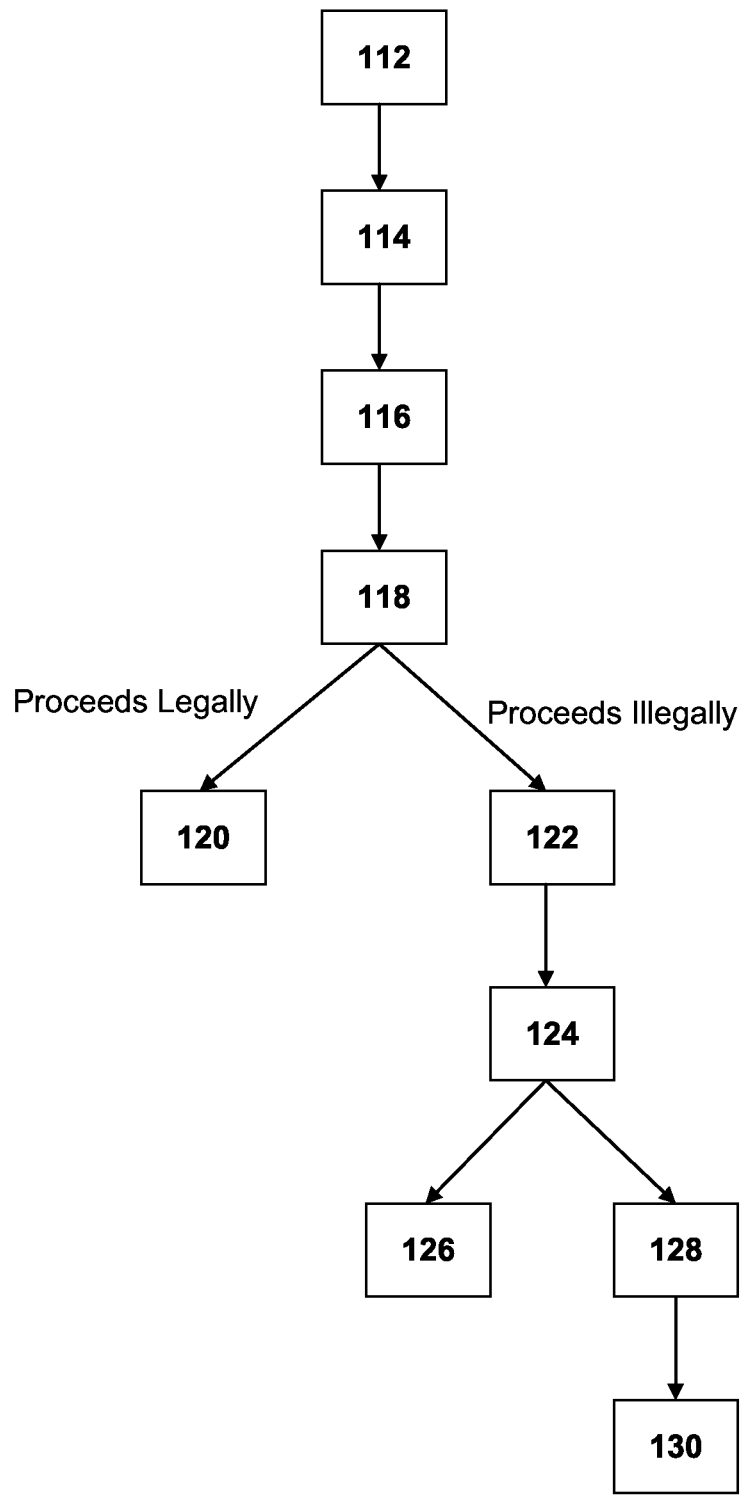
FIG. 2 illustrates a flow chart of an exemplary embodiment of a firearm safety system.

As illustrated in FIG. 2, any smart firearm 300 owner who tried to cross the safety perimeter 204 into the safety zone 202 with an activated smart firearm 300 would trigger a safety alert to all law officers, and the smart firearm 300 and/or smart magazine 400 would automatically lockdown immediately once crossing into the established safety perimeter 204, thereby rendering the weapon inoperable.

Figure 7:
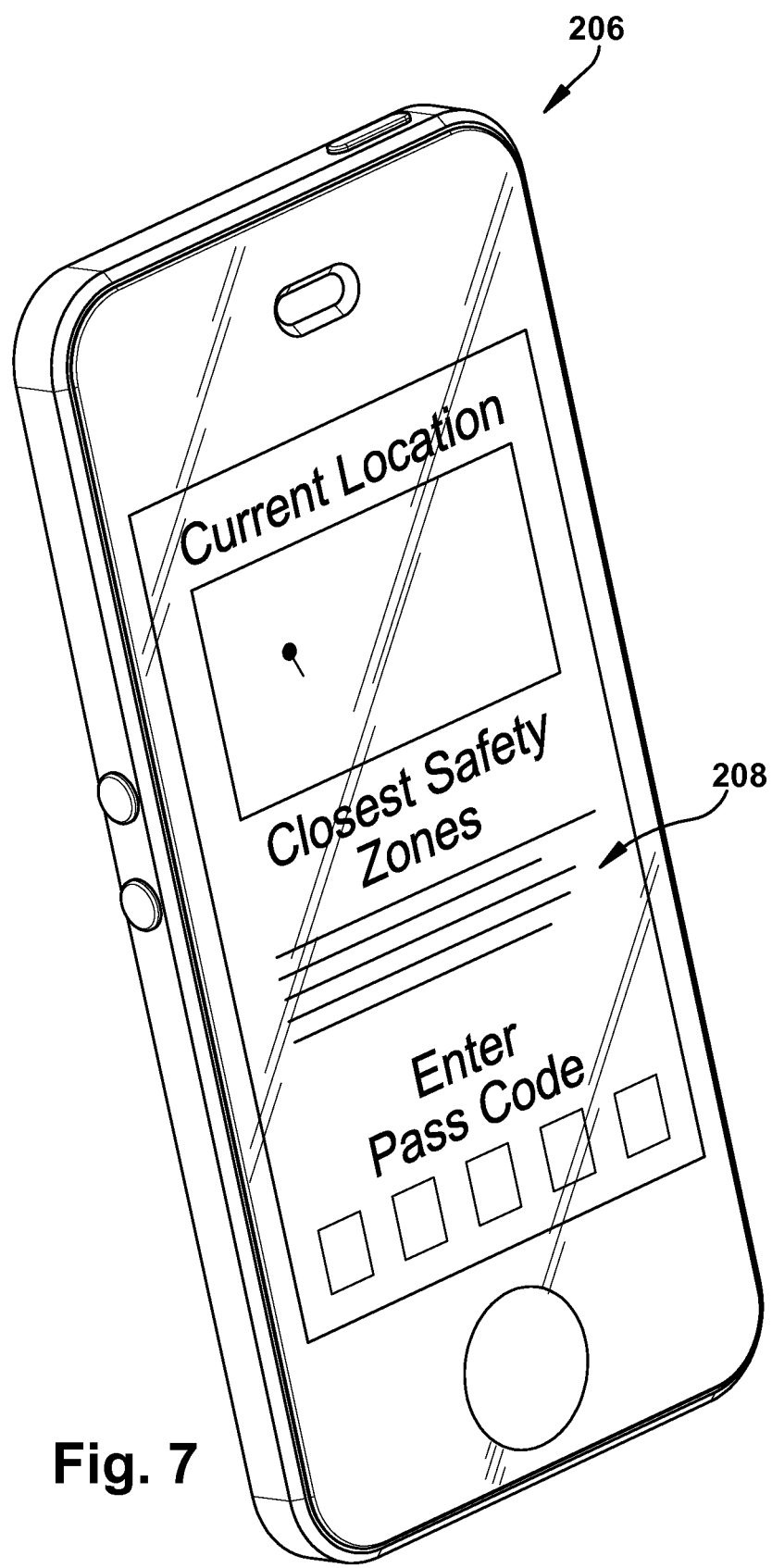
FIG. 7 illustrates a perspective view of a portable electronic device of an exemplary embodiment of the firearm safety system.

Each firearm safety system 100 may be used in conjunction with a smart tracking unit 206, as illustrated in FIGS. 1 and 7. The smart tracking unit 206 may be a portable electronic device, such as the firearm owner's mobile phone 206 or smart phone 206, or the portable electronic device may be a separate unit that may be used in conjunction with the firearm safety system 100. When discussed throughout the application, it is to be understood that when referring to the smart tracking unit it may also be referring to the owner's mobile smart phone 206, and when referring to the owner's mobile smart phone 206 it may also be referring to a separate smart tracking unit. The smart tracking unit 206 may be of any appropriate shape, size, type or configuration, such as a small electronic device that may fit in the owner's pocket or purse, or easily fit on the owner's person in a small and convenient manner.

The tracking system 200 may establish and monitor all safety zones 202 and safety perimeters 204 by using a smart tracking application ("app") 208, such as a phone app 208, and any appropriate tracking means. For example, in an exemplary embodiment, the tracking system 200 may utilize various established satellites 210, such as government and telecommunication satellites. In other exemplary embodiments, the tracking system 200 may utilize various sensors, radar, multilateration of radio signals between several radio towers of the network and the phone, underground wiring (such as with an underground pet fence) and the like. The smart firearm 300 and smart magazine 400 may be in constant communication with and operated by a smart tracking application on an owner's smart phone 206 or smart tracking unit.

The satellite tracking system 210 may utilize GPS, A-GPS (Assisted Global Satellite Positioning System) or GPSone (GPS One, Global Satellite Positioning System One) satellite positioning technology, and the GPS information related to the SmartGun/SmartMag, including a combination of time, position, altitude and speed, are transmitted to the remote server 110.

The satellite tracking system 210 may include various kinds of wireless communications, including, but not limited to, RF (radio frequency), GSM (Global System for Mobile Communications), GPRS (General Packet Radio Services), CDMA (Code Division Multiple Access), WiMax (Worldwide Interoperability for Microwave Access), WiFi (Wireless Fidelity), or satellite to satellite communication.

The smart firearm 300 and tracking system 200 may work together in conjunction with the owner's activated smart phone 206 tracking app 208. The smart firearm 300 and smart magazine 400 may be operated through a smart tracking app 208 that may be downloaded or uploaded onto any mobile smart phone 206, smart tracking unit and/or small electronic device. With reference to FIG. 7, the smart tracking app 208, the registered gun owner may lock or unlock his or her smart firearm 300 with a pass code, such as a password, numerical or alpha numerical code. The smart firearm 300 may then be operable in all unrestricted areas. For example, in use, the smart firearm 300 may be unlocked by the owner. To unlock the smart firearm 300, the owner may enter a pass code into the owner's smart tracking phone app 208 on the owner's smart phone 206, as shown in FIG. 7. The smart firearm 300 may then be operable on the owner's property, hunting grounds, shooting ranges, and any unrestricted public areas.

Every firearm safety system 100 may work in conjunction with the smart firearm 300, owner's smart phone 206 and smart tracking app 208. As illustrated in FIG. 2, the firearm owner may log onto the smart tracking app 208 on their smart phone 206 and enter their pass code to activate their weapon (112). Once the weapon owner is out in public their firearm may operate as normal unless in a safety zone (114). Once the weapon owner approaches a safety perimeter 204 (116), the owner may receive a notice or warning of the safety perimeter 204 and safety zone 202 (118). At this point the weapon owner may either choose to proceed legally or illegally. If the owner chooses to proceed legally, the weapon owner may enter their pass code into the smart tracking app 208 and lockdown their smart weapon (120). If the weapon owner decides to proceed illegally, the owner chooses not to lock down their smart weapon (122).

With further reference to FIG. 2, the owner of the smart weapon may then crosses a safety perimeter 204 or enters a safety zone 202 (124), whereby their smart weapon may be remotely deactivated (128) by communications between the smart firearm 300/smart magazine 400 and tracking system 200 components, thereby rendering their smart firearm 300 or smart magazine 400 inoperable. Simultaneously, law enforcement officers may be notified of the safety zone 202 violation (126) and then arrive on scene to apprehend the weapon owner (130).

With reference to FIG. 7, the smart tracking phone app 208 may also tell the firearm owner where the safety zones 202 are located and warn the smart firearm 300 owner ahead of time so that the firearm owner may avoid violating the safety zone 202. For example, there may be options in the smart tracking app 208 that the owner may personalize regarding when the firearm owner is notified of a safety zone 202. The owner may personalize how often he or she is notified, the distance away from the safety zone 202 before the owner is notified, and the like. There may also be an option that the owner may select that may automatically lock down the owner's smart firearm 300 prior to entering a safety zone 202, such as within 10 feet of a safety zone 202 the owner may choose to have his or her smart weapon automatically lock down, so that the owner does not have to worry about breaking the law.

Whenever the smart firearm 300 may be activated by the owner in a public area, the smart firearm 300 may be tracked via satellite 210, such as by a Global Positioning System (GPS) or any other appropriate tracking means, by the tracking system 200. It is widely known to be able to track cell phones 206 by satellite 210. There are many GPS phone 206 applications online, such as Google Maps and Google Latitude. Once the smart tracking app 208 is installed on the owner's smart phone 206, the phone 206 may send a signal to a GPS satellite 210, which will then send the signal back to a receiver that will put the owner's location on a map.

The registered smart firearm 300 owner would be accountable and verified by his or her established phone service records. Alternatively, the registered smart firearm 300 owner may be verified by any other appropriate type of record, such as by social security number, tax records, utilities, and the like, and should not be limited to that disclosed herein. As an alternative, the smart firearm 300 or smart magazine 400 owner may be required to go into a location, such as a gun store, police station or the like, to have their smart firearm 300 or smart magazine 400 updated, upgraded and/or verified. This way the owner information may be consistently updated and accurate so that the owner of the smart firearm 300 or smart magazine 400 may be held accountable for his or her actions. For example, the smart gun or smart magazine 400 owner may go into a police station, log onto a computer to update and verify their contact information. This could be a mandatory law, voluntary, and/or could be associated with necessary upgrades to the smart firearm 300 system. These upgrades and updates may be included in the cost of the smart firearm 300 or smart magazine 400.

The tracking system 200 may establish and monitor all safety perimeters 204 and safety zones 202 by using the smart tracking app 208 and various government satellites 210. Any activated smart firearm 300 or smart magazine 400 may be deactivated via communications between the smart tracking system 200 and various components in communication with that system. If the owner of the smart firearm 300 approaches within 1000 feet of any safety zone 202 the smart tracking app 208 may alert the firearm owner. The smart firearm 300 and/or smart magazine 400 may automatically lockdown once the gun owner crosses the safety perimeter 204 of the established safety zone 202. An immediate alert is also sent out to all local law officers. The safety perimeter 204 may be established around all schools, government buildings, corporate service subscribers and the like.

Protected public entities with established safety perimeters 204 may set the perimeter distance as desired (e.g., 3,000 foot perimeter for a school, or a 5,000 foot for a military base). Anyone with a smart firearm 300 or smart magazine 400 would not be able to encroach the established safety perimeter 204 without deactivating the smart firearm 300 or smart magazine 400 and alerting authorities simultaneously. Once smart firearms 300 or smart magazines 400 are the only weaponry allowed in public areas, safety zones 202 may be established in various public areas. All public threats would be severely hindered by implementation of the firearm safety system 100 and related technology.

With the firearm safety system 100 technology, the threat of gun theft may decrease dramatically. The owner of the smart firearm 300 or smart magazine 400 may have a pass code for their smart firearm 300. The smart firearm 300 may have to be used in conjunction with the owner's smart phone 206 only. Owners of smart firearms 300 and smart magazines 400 may also lock their weapons while not in use or while the owner is away from the firearm. The owner may also lock their weapons remotely if they forgot, or as needed for safety purposes.

If the smart firearm 300 is used in conjunction with the owner's smart phone 206, the smart firearm 300 would know if it is pointed in the direction of the smart firearm owner by signals being communicated and sent between the system components. This may prevent the gun owner from having their smart firearm 300 used against them by an assailant, eliminate smart firearm 300 weapon theft, and may also prevent suicide from being committed with a smart firearm 300. In an exemplary embodiment, the gun owner may typically have his or her smart phone 206 on their person in addition to their smart firearm 300 or smart magazine 400.

The smart phone 206 may be able to communicate with the smart firearm 300 or smart magazine 400 via any appropriate manner, such as sensors located in the system components, satellite tracking, etc. The smart firearm 300 may communicate with the smart phone 206 to indicate that the smart firearm 300 is pointed towards the smart phone 206. Once the smart phone app 208 picks up that the smart firearm 300 is pointed towards the gun owner and the smart phone 206, the smart tracking app 208 may communicate with the smart firearm 300 to disarm the gun and prevent the gun from being shot at the gun owner.

Alternatively, the gun owner may also be implanted with a RFID chip or the like that may emit a signal that the smart tracking app 208 may also tracks. This signal may be used to determine if the smart firearm 300 is being pointed at the owner of the smart firearm 300 or smart magazine 400, thereby disabling the smart firearm 300 or smart magazine 400 from being able to shoot the weapon at the owner.

As the owner of a smart firearm 300 approaches an established safety zone 202 their smart phone app 208 may issue a warning, such as an audible and/or vibration warning, advising them that they need to legally deactivate their smart firearm 300. If a smart firearm 300 owner crosses the safety perimeter 204, the smart firearm 300 and smart magazine 400 may automatically lockdown making the weapon inoperable. Simultaneously local law officers may be notified of the safety zone violation and arrest the disarmed suspect. The safety zones 202 may be established at schools, charges, government buildings, military facilities, conflict zones, political and public events, and many others.

In an exemplary embodiment, each smart firearm 300 owner must have a tracking mobile unit, or smart phone 206 with the smart tracking phone application 208 to operate it. To activate the smart firearm 300, an individualized pass code combination may be entered into the tracking unit or phone app 208. A smart firearm 300 may be developed and configured for every make, model, caliber size, and the remote automatic trigger lockdown may be used for any device that uses a trigger mechanism. The law abiding citizen may be free to legally carry his smart firearm 300 equipped with a smart magazine 400 in any unrestricted area. However, if the gun owner approaches 1,000 feet of any safety perimeter 204 with an activated smart firearm 300, the smart tracking phone app 208 or a separate smart tracking unit may warn them to legally deactivate their smart firearm 300.

While 1,000 feet may be suggested as a default starting point, it may be preferable that larger caliber firearms with more effective ranges have a larger distance between the safety perimeter 204 and protected facility 102. For example, .50 caliber may have a 6,000 foot established safety perimeter 204 and a 9 mm may have a 3,000 foot safety perimeter 204.

Figure 3:
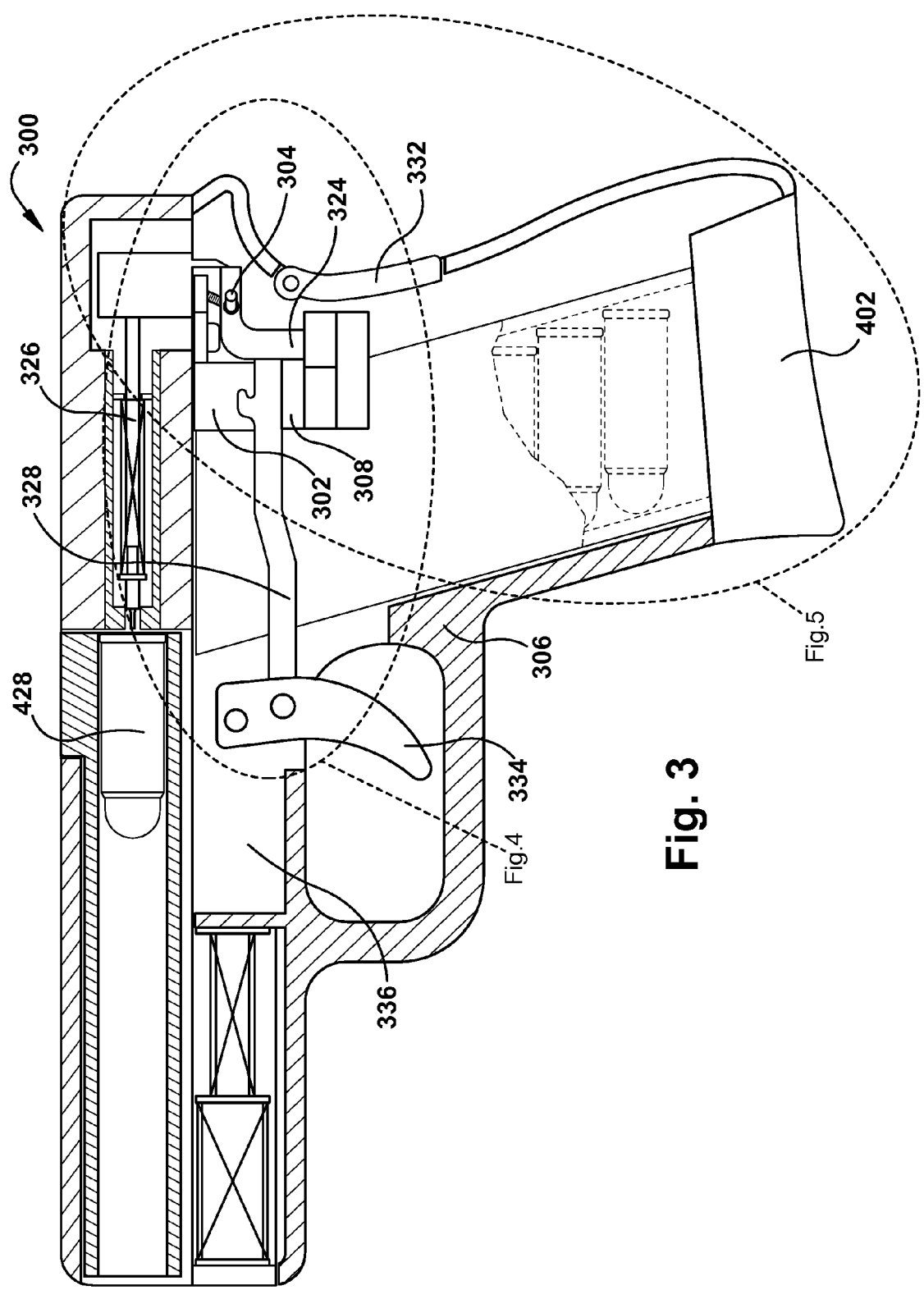
FIG. 3 illustrates a side cut away view of an exemplary embodiment of a smart firearm of the firearm safety system.

With reference to FIG. 3, the smart firearm 300 may include a computer processing unit 302, such as a microprocessor, and an automatic safety lock 304 located within and/or secured to the frame 306 of the firearm. The automatic safety lock 304 may operate in various manners depending upon the type of firearm being utilized, such as a pistol, rifle, etc. The automatic safety lock 304 may be of any appropriate shape, size, type or configuration, such as a bar, L-shaped bar, and the like, depending upon the desired location of the automatic safety lock in the desired type of weapon. The microprocessor 302 may lock down the smart firearm 300 via the automatic safety lock 304.

Figure 4:
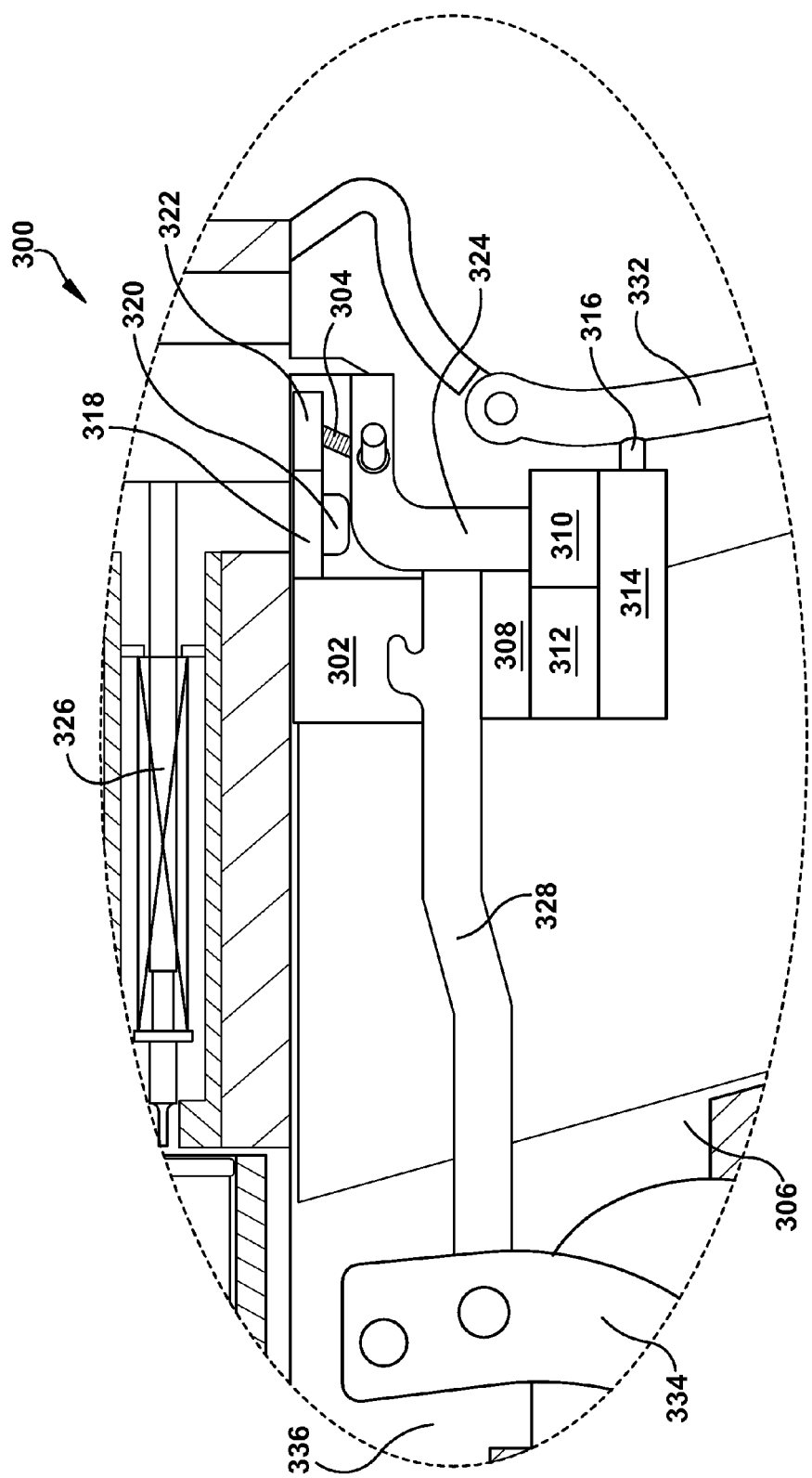
FIG. 4 illustrates a close up side view of FIG. 3 of an exemplary embodiment of an automatic safety lock for a smart firearm of the firearm safety system.

The automatic safety lock 304 may be located in any appropriate location on the frame 306 of the smart firearm 300, depending upon where the safety lock 304 may best fit. In an exemplary embodiment and with reference to FIG. 4, the smart firearm 300 may comprise a subcompact 9 mm pistol, for example. In the exemplary embodiment, as shown in FIG. 4, the smart firearm 300 may include various electronic and telecommunication components, such as a microprocessor 302, a firearm tracking component 308 (such as a GPS unit), a transmitter 310, a receiver 312, a battery 314 and an input port 316, such as for charging the battery 314 if needed. The smart firearm 300 may also include a switch 318, a relay 320 and a motor 322 connected to an automatic safety lock 304.

In use, the microprocessor 302 may receive a signal to lock down the smart firearm 300 and the automatic safety lock 304 may move into the lock position. As shown in FIG. 4, the subcompact 9 mm pistol may be locked down via the automatic safety lock 304 by preventing the sear 324 from moving the striker 326. The sear pin 324 of the firearm may be locked, thereby preventing the striker 326 from making contact with the cartridge primer. The trigger lock bar 328 could be housed in the grip 330 preventing the trigger bar 328 from moving the sear 324, which would lock the striker 326.

Figure 5:
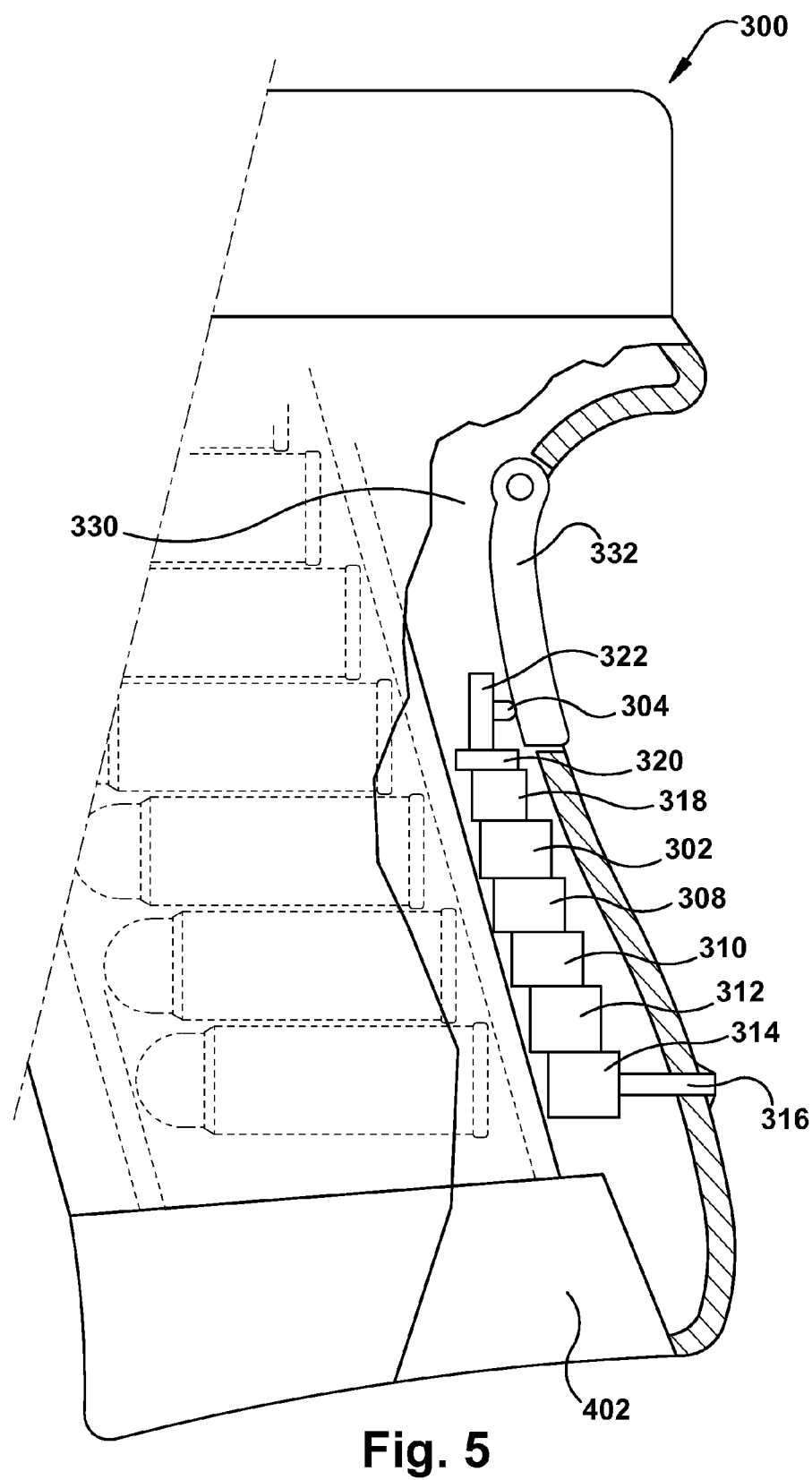
FIG. 5 illustrates a close up side view of FIG. 3 of an exemplary embodiment of an automatic safety lock for a smart firearm of the firearm safety system.

The location of the remote automatic safety lock 304 may depend on the make, model and caliber size of the firearm. In an alternative embodiment, as shown in FIG. 5, the smart firearm 300 may include various electronic and telecommunication components, such as a microprocessor 302, a firearm tracking component 308 (such as a GPS unit), a transmitter 310, a receiver 312, a battery 314 and an input port 316, such as for charging the battery 314 if needed. The smart firearm 300 may also include a switch 318, a relay 320 and a motor 322 connected to an automatic safety lock 304.

As illustrated in FIG. 5, the automatic safety lock 304 may comprise a lock bar 328 located within the grip safety 332 of the smart firearm 300. The remote automatic safety lock 304 may be placed at a point where a bar may prevent a grip safety 332 from depressing, which would render the firearm inoperable. In another exemplary embodiment, the remote automatic safety lock 304 may be placed in an area closer to the trigger 334 and next to a locking block 336 of the smart firearm 300, as shown in FIG. 3.

In an exemplary embodiment, the microprocessor unit 302 in the smart firearm 300 may have the GPS coordinates for any established safety perimeters 204. If the gun equipped with smart firearm 300 technology entered a safety zone 202, the microprocessor 302 in the smart firearm 300 would order the smart firearm 300 to execute the automatic safety lockdown procedure, which would activate the lock motor switch 318 to move the trigger automatic safety lock bar 304 into position locking the sear pin 324 in place rendering the firearm inoperable. Simultaneously, the microprocessor 302 on the smart firearm 300 in communication with the smart tracking unit 206 may transmit the location and any pertinent information to law authorities by using the tracking system remote server 110. Any smart firearm 300 crossing into a safety perimeter 204 would alert the tracking system 200. The tracking system 200 would send a satellite signal to the smart firearm 300 receiver 312.

A benefit of the smart firearm 300 is that it may prevent gun theft due to the assigned smart tracking unit 206 and/or smart tracking phone app 208 and individualized pass code. A child could no longer find a firearm and accidentally harm themselves. As a result of communications between the smart tracking unit 206 and the smart firearm 300, the firearm may go into automatic lockdown mode if it is pointed toward the direction of the smart firearm 300 owner, thus preventing assailants from using a smart firearm 300 against its owner, an owner accidentally shooting themselves, but also preventing a smart firearm 300 owner from attempting suicide.

During start up, the smart tracking app 208 and tracking system 200 may load the preset safety zone coordinates into the smart firearm 300. If the smart firearm 300 crosses a safety perimeter 204, the computer may activate the trigger lock bar motor 322. The lock motor 322 switches on and moves the trigger automatic safety lock bar 304 into the lock position, thereby sliding the lock bar 304 into the sear 324. With the lock bar 304 located in the lock position inside the sear 324, the sear 324 is unable to move preventing the striker 326 from moving, thereby rendering the weapon inoperable.

Every smart firearm 300 may be used in conjunction with the smart tracking smart phone app 208 and tracking system 200. All smart firearms 300 may have a personalized user pass code that may be used to activate the smart firearm 300. Each smart firearm 300 may be used on private property, designated spaces, and unrestricted public areas. If a smart firearm 300 owner ventured close to an established safety perimeter 204, their smart tracking app 208 may alert them to legally deactivate their smart firearm 300. Encroaching inside of the safety perimeter 204 may automatically lockdown the smart firearm 300 making the weapon inoperable and simultaneously alerting local law officers.

Every smart firearm 300 is used in conjunction with the smart tracking app 208 on their smart phone 206 and may be tracked by the tracking system 200. If the smart firearm owner approaches an established safety perimeter 204 their smart phone 206 may alert the owner to legally disarm their weapon. Crossing into the safety zone 202 may automatically deactivate the smart firearm 300 and simultaneously alert law officers.

The smart firearm 300 may enable communities to create safety zones 202 where no smart firearms 300 or smart magazines 400 can threaten them. It may be designated for every caliber type of weapon. Any gun manufactured from this point forward may be designed to be a smart firearm 300. This could include revolvers, pistols, shotguns, rifles, and the like, theoretically anything with a trigger.

Inside a safety perimeter 204 there may be established active smart firearms 300 for security purposes (e.g., military police officers on a military base, only officers' smart firearms 300 may be active while all other soldiers smart firearms 300 may be deactivated upon crossing the set safety perimeter 204. In another example, only the smart firearms 300 utilized by the Secret Service at a Presidential destination may be active. Alternatively, temporary events and special events, such as major sporting events, Olympics, concerts and the like may utilize safety zones 202.

Using a smart firearm 300 owner's smart phone 206 may help ensure their identity and make them accountable. If a smart firearm 300 is discharged in public, local law officers may be notified immediately of the disturbance and location and provide any necessary assistance. A smart firearm 300 may be locked remotely by the owner for travel or safety purposes.

The firearm safety system 100 may also deter gun theft. When the smart firearm 300 is used in conjunction with the owner's smart phone 206, the smart firearm 300 may know if it is pointed in the direction of the smart firearm 300 owner by signals communicated between the system components. This may prevent the owner from having their smart firearm 300 used against them by an assailant. A smart firearm 300 owner may also be prevented from trying to use their smart firearm 300 to commit suicide.

The firearm safety system 100 may bring smart weapon technology to citizens of the world. For the first time no gun safety zones 202 may be established, thereby preventing any smart firearm 300 or smart magazine 400 from being discharged inside the safety zone 202 while simultaneously alerting law officers of a public safety threat. If smart firearm 300 and smart magazine 400 equipped weapons were the only weapons allowed in public, the government could create safety nets over sensitive public areas. Citizens may have the freedom and responsibility to have a smart weapon in public, but they could pose no threat to protected no gun safety zone 202 sites. The firearm safety system 100 directly attempts to combat gun violence in the public while still allowing citizens to utilize their $2^{nd}$ Amendment rights.

Figure 6:
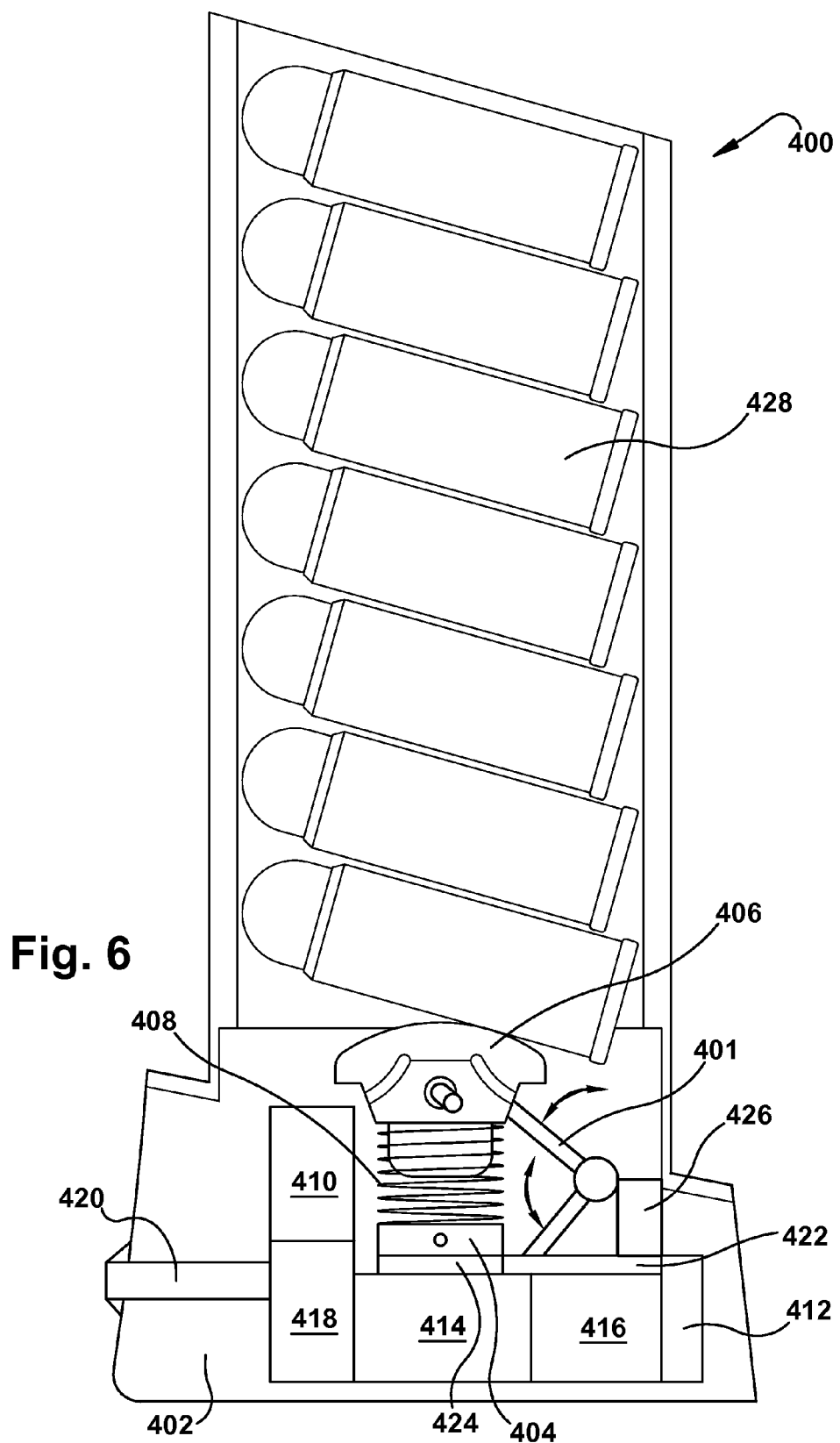
FIG. 6 illustrates a side cut away view of an exemplary embodiment of a smart magazine of the firearm safety system.

An exemplary embodiment of a smart magazine 400 is illustrated in FIG. 6. The smart magazine 400 may be designed for every make and caliber of gun magazine. It may be used to replace any magazines that gun owners would be allowed to carry in public. Any gun equipped with a smart magazine 400 may be used in conjunction with the gun owner's smart phone app 208 connecting the smart magazine 400 to the tracking system 200. The smart magazine 400 may be used in any unrestricted public area or designated space. If the gun owner were to approach an established safety zone 202, their phone 206 would alert them to disarm their weapon. Crossing the established safety perimeter 204 would automatically lockdown the smart magazine 400 and simultaneously alert local law officers, thereby preventing any public threat.

The automatic safety lock 401 may be located in any appropriate location on the smart magazine 400, depending upon where the safety lock may best fit. In an exemplary embodiment and with reference to FIG. 6, the smart magazine 400 components may be located within the magazine base 402, between the magazine base 402 and the locking plate 404. The locking plate 404 may also be attached to a magazine follower 406 via a magazine spring 408. The smart magazine 400 may include various electronic and telecommunication components, such as a microprocessor 410, a firearm tracking component 412 (such as a GPS unit), a transmitter 414, a receiver 416, a battery 418 and an input port 420, such as for charging the battery 418 if needed. The smart magazine 400 may also include a switch 422, a relay 424 and a motor 426 connected to an automatic safety lock 401, as shown in FIG. 6.

The microprocessor unit in the smart magazine 400 may have the GPS coordinates for any established safety perimeters 204. If a firearm equipped with a smart magazine 400 entered a safety perimeter 204, the smart magazines microprocessor 410 may order the smart magazine 400 to execute the automatic safety lockdown procedure, which may activate the lock motor switch 422 to move the automatic safety lock bar 401 into position locking the magazine follower 406 in place. As shown in FIG. 6, the magazine follower 406 may be prevented from feeding ammunition 428 to the weapon, thereby rendering the firearm inoperable. Simultaneously, the microprocessor 410 on the smart magazine 400 in communication with the smart tracking unit or smart phone 206 may transmit the location and any pertinent information to law authorities by using the tracking system's 200 remote server 110.

Any magazine fed weapon or firearm may utilize the smart magazine 400. Any gun equipped with the smart magazine 400 may be used in conjunction with the smart tracking app 208 on the user's smart phone 206. The smart magazine 400 may be used in any unrestricted public area or designated space. If the smart magazine 400 owner were to approach an established safety zone 202 their smart phone 206 may alert them to deactivate their weapon. Crossing the safety perimeter 204 into the safety zone 202 would automatically lockdown the smart magazine 400, thereby rendering it inoperable and simultaneously alerting local law enforcement officers.

In an exemplary embodiment, once a person violates a safety zone 202, the tracking system 200 may transmit a satellite 210 signal to the receiver on the smart magazine 400 unit. The microprocessor 410 may then move the switch 422 to move the magazine follower 406 safety lock bar 401 into the lock position. The lock mechanism may slide the magazine follower 406 automatic safety lock bar 401 into position inside a hole on the magazine follower 406. The smart magazine 400 may then be locked and inoperable because the magazine follower 406 and spring 408 may be locked in place, thereby making the smart magazine 400 unable to feed the weapon ammunition 428.

The smart magazine 400 may be configured for every make and model, caliber and magazine type. To initially establish use of the firearm safety system 100, all gun magazines produced prior to the smart magazine 400 being introduced into the market may be retrofitted or may be relegated to use on private property. Once all weapon owners are required to have smart magazines 400 in public, safety zones 202 may then be established worldwide. Subsequently, every weapon produced in the near future may contain smart firearm 300 technology inside its frame 306, thereby making every gun owner safe, accountable and thus removing the threat to sensitive public areas.

The smart magazine 400 may make any magazine fed weapon capable of being smart or being locked via the computer processing unit or microprocessor 410. The smart magazine 400 may prevent public threats by any weapon equipped with a smart magazine 400. Using the smart magazine 400 owner's smart phone 206 may help ensure their identity as well as make the weapon owner accountable. If any smart firearm 300 or smart magazine 400 equipped weapon is discharged, the local law officers would be notified of the disturbance and the exact location and be dispatched to provide any assistance needed.

A major benefit is that the smart magazine 400 may make all older magazine fed weapons owner's accountable and safe in public areas and diminishes public threats. The only drawback that has been found with the smart magazine 400, is that a weapon with a smart magazine 400 may, however, still be fired once, or have each round chambered separately.

A smart magazine 400 owner must have a mobile tracking unit, or smart phone 206 with the smart tracking phone application 208. To activate the smart magazine 400, an individualized pass code combination may be entered into the tracking unit or phone app 208. A smart magazine 400 may be developed and configured for every make, model and caliber size.

The smart magazine 400 may allow the law abiding citizen to be free to legally carry his or her firearm equipped with a smart magazine 400 in any unrestricted area. However, if the gun owner approaches 1,000 feet of any safety perimeter 204 with an activated smart magazine 400, the smart tracking app 208 may warn them to legally deactivate their smart magazine 400. It may be suggested that larger caliber firearms with more effective ranges should have a larger distance in between the safety perimeter 204 and protected facility 102. For example, .50 caliber may have a 6,000 foot established safety perimeter 204 and a 9 mm may have a 3,000 foot safety perimeter 204.

In an exemplary embodiment, a smart firearm 300 or smart magazine 400 owner may have a smart tracking mobile unit, or smart phone 206 with the smart tracking phone application 208. To activate the gun an individualized pass code combination may be entered into the smart tracking unit or phone app 208. The law abiding citizen may be free to legally carry his firearm in any unrestricted area. However, if the gun owner approaches 1,000 feet of a safety perimeter 204 his or her smart tracking unit 206 may warn him to legally deactivate the weapon. The microprocessor unit 302 in the firearm may have the GPS coordinates for the safety perimeter 204. If the firearm owner entered the safety perimeter 204, the microprocessor 302 may order the smart firearm 300 or smart magazine 400 into automatic lockdown mode rendering the firearm and magazine inoperable. Simultaneously, the smart tracking unit 206 may transmit a Safety Zone Violation to local authorities to alert law officers and speed up response time.

Each smart firearm 300 or smart magazine 400 may have a GPS tracker 308, 412 located within it, being provided with a GPS receiving circuit 312, 416, a microprocessor 302, 410 and a signal transmission circuit 310, 414. Information may be transmitted to a microprocessor unit 302, 410 in each smart firearm 300 or smart magazine 400. Each smart firearm 300 and smart magazine 400 may be equipped with a GPS tracking system 308, 412, the GPS tracker may be provided with a GPS receiving circuit, a microprocessor and a signal transmission circuit. The microprocessor may be separately connected to the GPS receiving circuit and the signal transmission circuit.

The GPS receiving circuit may be able to receive geographic positioning satellite 210 coordinate signals, and then the geographic positioning satellite 210 coordinate signals may be matched with an internal pre-stored geographic database to obtain the position of the smart firearm 300 or smart magazine 400, whereupon the position may then transmitted to the microprocessor. The microprocessor may obtain the position of the smart gun 300 or smart magazine 400 from the GPS receiving circuit, and may obtain the circumstances of the safety zone violation, whereupon the microprocessor 302, 410 may execute the automatic safety lock of the smart firearm 300 and smart magazine 400. Accordingly, the signal transmission circuit may transmit the information obtained to a remote server 110, which may notify the relevant authorities, thereby completely disabling the smart firearm 300 and smart magazine 400 and alerting law officers.

If a smart firearm 300 violates an established safety perimeter 204, the microprocessor 302 transmits the location of the smart firearm 300 to authorities via the tracking system's 200 remote server 110. Simultaneously, the microprocessor 302 on the smart firearm 300 or smart magazine 400 may execute the automatic lockdown procedure. The microprocessor unit 410 may engage the smart magazine 400 follower automatic safety lock bar 401 into the lock position disabling the magazine until law officers can arrive. The microprocessor 302 may also engage the trigger automatic safety lock 304 on the smart firearm 300 with the lock location depending on the make and caliber. As discussed above, a smart firearm 300 automatic safety lock may be located on the sear pin 324, grip safety 332, or near the locking block 336.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. A firearm safety apparatus comprising:
a gun frame housing a first microprocessor;
a first receiver in communication with the first microprocessor, wherein the first receiver is configured to receive a signal;
at least one motor in communication with the first microprocessor;
a trigger;
a sear mechanically connected with the trigger;
a striker mechanically connected with the sear and being operable to selectively contact an associated bullet to thereby shoot the associated bullet from the gun frame;
a first safety lock in communication with the first microprocessor and the at least one motor;
a magazine frame housing a second microprocessor and a feed member configured to selectively communicate the associated bullet to the gun frame;
a second receiver in communication with the second microprocessor, wherein the second receiver is configured to receive the signal; and
a second safety lock in communication with the second microprocessor;
wherein the at least one motor is configured to selectively operate the first safety lock to prevent the striker from operating in response to the signal received by the first receiver;
wherein the second safety lock is configured to selectively prevent the feed member from communicating the associated bullet to the gun frame in response to the signal received by the second receiver.

2. The apparatus of claim 1, wherein the first safety lock is configured to prevent the sear from engaging the striker whereby the gun frame is unable to operate.

3. The apparatus of claim 2, wherein the first receiver is configured to receive location data from at least one satellite.

4. The apparatus of claim 3, further comprising at least one transmitter configured to communicate with the first microprocessor and the first receiver, wherein the at least one transmitter is configured to transmit a signal.

5. The apparatus of claim 4, further comprising a tracking unit in communication with the first microprocessor.

6. The apparatus of claim 5, wherein the tracking unit includes an internal geographical database of specific monitored locations.

7. The apparatus of claim 6, wherein the specific monitored locations include schools.

8. The apparatus of claim 7, wherein the specific monitored locations include federal buildings.

9. The apparatus of claim 8, wherein the first safety lock comprises a bar.

10. The apparatus of claim 9, wherein the first safety lock is configured to selectively permit the gun frame to operate and to selectively prevent the gun frame from operating.

11. The apparatus of claim 10, wherein the specific monitored locations include a designated no gun safety zone around the locations.

12. The apparatus of claim 11, wherein the first receiver is capable of receiving geographic coordinate signals and the first microprocessor is capable of matching the geographic coordinate signals with a stored geographical database of specific monitored locations.

13. The apparatus of claim 12, wherein:
the first receiver is adapted to receive a second signal indicating that the apparatus is approaching a no gun safety zone; and
the first microprocessor is configured to operate the first safety lock responsive to the second signal received by the first receiver.

14. The apparatus of claim 1, wherein the second receiver is configured to receive location data from at least one satellite.

15. The apparatus of claim 14, further comprising a transmitter configured to communicate with the second microprocessor and the second receiver, wherein the transmitter is configured to transmit a signal.

16. The apparatus of claim 15, further comprising a tracking unit in communication with the second microprocessor, wherein the tracking unit includes an internal geographical database of specific monitored locations.

17. The apparatus of claim 16, further comprising:
a portable electronic device configured to communicate with the tracking unit;
wherein the portable electronic device is configured to one or more of: selectively operate the first safety lock to prevent the striker from operating in response to the signal received by the first receiver, and selectively prevent the feed member from communicating the associated bullet to the gun frame, and
wherein when the apparatus approaches a specific location being monitored, the portable electronic device is capable of producing a warning signal, and further wherein when the apparatus enters into the specific location being monitored, the apparatus is configured to be locked down upon entering the specific location being monitored.

18. The apparatus of claim 1, wherein the second receiver is capable of receiving geographic coordinate signals and the second microprocessor is capable of matching the geographic coordinate signals with a stored geographical database of specific monitored locations.

* * * * *